United States Patent
Ott et al.

(10) Patent No.: US 6,968,990 B2
(45) Date of Patent: Nov. 29, 2005

(54) FABRICATION AND UTILIZATION OF METALLIC POWDER PREPARED WITHOUT MELTING

(75) Inventors: Eric Allen Ott, Cincinnati, OH (US); Andrew Philip Woodfield, Cincinnati, OH (US); Clifford Earl Shamblen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 10/350,668

(22) Filed: Jan. 23, 2003

(65) Prior Publication Data

US 2004/0146640 A1 Jul. 29, 2004

(51) Int. Cl.[7] .............................................. B23K 20/24
(52) U.S. Cl. ........................................................ 228/203
(58) Field of Search ................................ 228/203, 217, 228/214, 205, 206, 211; 205/57, 363; 75/613, 614

(56) References Cited

U.S. PATENT DOCUMENTS

| | | | |
|---|---|---|---|
| 3,469,301 A | * | 9/1969 | Freyberger et al. ......... 228/176 |
| 5,322,666 A | | 6/1994 | Watwe |
| 5,779,761 A | | 7/1998 | Armstrong et al. |
| 5,865,980 A | * | 2/1999 | Ray et al. ................... 205/367 |
| 5,930,580 A | | 7/1999 | Everett |
| 5,958,106 A | | 9/1999 | Armstrong et al. |
| 6,117,208 A | * | 9/2000 | Sharma ....................... 75/613 |
| 6,712,952 B1 | * | 3/2004 | Fray et al. ................... 205/640 |

FOREIGN PATENT DOCUMENTS

| | | |
|---|---|---|
| JP | 57171603 | 10/1982 |
| JP | 01294810 | 11/1989 |
| JP | 11291087 | 10/1999 |
| WO | WO 99/64638 | 12/1999 |

* cited by examiner

*Primary Examiner*—Jonathan Johnson
(74) *Attorney, Agent, or Firm*—McNees Wallace & Nurick LLC

(57) ABSTRACT

A metallic alloy made of metallic constituent elements is fabricated and utilized by first furnishing a mixture of nonmetallic precursor compounds of the metallic constituent elements, and thereafter chemically reducing the mixture of nonmetallic precursor compounds to produce a metallic alloy as a metallic alloy powder, without melting the metallic alloy. The metallic alloy powder is applied to a surface of a substrate article, preferably in a coating, joining, or deposition application.

22 Claims, 2 Drawing Sheets

FABRICATION AND UTILIZATION OF METALLIC POWDER PREPARED WITHOUT MELTING

This invention relates to the preparation of a powder of a metallic alloy which is not melted during its preparation, and to the use of the metallic powder.

BACKGROUND OF THE INVENTION

Metallic articles are fabricated by any of a number of techniques, as may be appropriate for the nature of the metal and the article. In one common approach, metal-containing ores are refined to produce a molten metal, which is thereafter cast. The metal is further refined as necessary to remove or reduce the amounts of undesirable minor elements. The composition of the refined metal may also be modified by the addition of desirable alloying elements. These refining and alloying steps may be performed during the initial melting process or during subsequent remelting. After a metal of the desired composition is produced, it is cast. The cast piece may be used in the as-cast form for some alloy compositions (i.e., cast alloys), or further worked to form the metal to the desired shape for other alloy compositions (i.e., wrought alloys). Instead of casting it to shape, the molten metal may be atomized to produce fine-scale droplets, which then solidify to form fine-scale powders. The powders are thereafter compacted or consolidated to produce useful articles. In any case, further processing such as heat treating, machining, surface coating, and the like may be employed.

Metallic alloys in finely divided form are utilized for a number of processes in order to minimize the scale of solidification segregation (as a result of the droplet size and cooling rate) and/or to provide a convenient material form for transport to, and application on, a substrate surface. During some processes, for example liquid or semi-solid phase deposition and fusion welding processes, the material is melted during or after application. In some other processes, for example cold spray, slurry coating, laser sintering, and vapor-phase deposition, the material is not subsequently melted during the application process. In still other processes, for example brazing and transient liquid phase bonding, the material is melted but for a very brief period of time, typically less than 10 minutes.

These fabrication processes have fundamental limitations. Some metallic alloy compositions cannot be prepared by melting techniques in commercial-scale production due to thermophysical melt incompatibilities between the alloying elements. The melting operation can also result in impurities in the melt, which then reach the final product unless special and costly refining steps are used. In some cases, the introduction of the impurities is not known, and removal is not addressed. The melting operation can leave unmelted inclusions in the metallic final product, such as ceramic particles from the melting crucible, and particles of oxide dross. These inclusions may lead to early failure of the final article due to crack initiation and propagation. The macrostructure and microstructure of the final article are dictated in part by the structure produced upon solidification, and in many instances great efforts are expended to alter the as-cast microstructure to improve mechanical properties. Powder techniques are employed to reduce composition and structure variations inherent in cast and wrought materials across the article, but the powder techniques have their own disadvantages such as incorporation of the atomization gas into the powder particles, and extraneous contamination of powder during processing.

Incremental performance improvements resulting from processing modifications are still possible in a number of areas. However, the present inventors have recognized in the work leading to the present invention that in other instances the basic fabrication approach imposes fundamental performance limitations that cannot be overcome at any reasonable cost. They have recognized a need for a departure from the conventional thinking in fabrication technology which will overcome these fundamental limitations. The present invention fulfills this need, and further provides related advantages.

BRIEF SUMMARY OF THE INVENTION

The present approach provides a method for fabricating and utilizing a metallic powder made of a metallic alloy. The metallic powder is prepared without melting the metal or the powder. This approach avoids problems associated with melt-produced powders, such as impurities associated with the ore source of the metal and the melting process, elemental segregation, and the inability to manufacture compositions that involve thermophysically melt incompatible elements. The metallic powder has a narrow size distribution, providing better utilization in some processes. The present approach is economical to use in both large-run and small-run sizes.

A method for fabricating and utilizing a metallic alloy made of metallic constituent elements comprises the steps of furnishing a mixture of nonmetallic precursor compounds of the metallic constituent elements, thereafter chemically reducing the mixture of nonmetallic precursor compounds to produce a metallic alloy as a metallic alloy powder, without melting the metallic alloy, and thereafter applying the metallic alloy powder to a surface of a substrate article.

The precursor compounds may be of any operable type compatible with the reduction technique that is employed. Examples of operable classes of precursor compounds include inorganic salts and oxides.

The chemical reduction may be performed by any operable technique. Examples of operable techniques include solid-phase reduction and vapor-phase reduction.

The result of the chemical reduction is the metallic alloy powder that has not been melted. The metallic alloy powder may be of any operable composition. Examples include nickel-base and cobalt-base alloys for use in airfoils such as turbine blades and vanes; nickel-base, cobalt-base, and titanium-base alloys for use in welding; cobalt-base alloys for wear coating; the matrices of composite materials, such as a nickel-base alloy containing silicon carbide particles; aluminum-containing alloys for vapor phase aluminiding; and protective coating materials such as NiCrAlY and FeCrAlY. This listing is presented by way of example and not limitation.

The metallic alloy powder may thereafter be utilized in any operable manner. In one class of approaches, the metallic alloy powder is applied with an associated melting of the metallic alloy powder. Some examples include laser deposition, plasma spray, flame spray, or thermal spray of the powder, and welding processes using the powder as the filler or overlay material. The metallic alloy powder used in such subsequent-melting processes has the advantages that the powder has a well-defined composition without the impurities inherited from the ores and from subsequent processing steps up to and including melting. The metallic alloy powder is free of ceramic inclusions that are normally introduced into metallic melts from crucibles, and is free of trapped gas associated with gas-atomization powder-production processes. The process is highly economical, due to the reduction in the number and type of processing steps to reach the powder stage, in the absence of loss of skull material in skull-melting processes, and in the ability to readily scale between small and large production runs. The composition of the powder may be precisely controlled, to achieve controllable compositions of major elements including elements that otherwise cannot be readily co-processed, to eliminate undesirable impurities that otherwise impose limitations on subsequent processing, and to add desirable innoculants that may be difficult or impossible to add in melt-based powder production. The powder itself is narrowly sized, an important consideration in the technical operability of many application processes and which often requires powder-size classification and diversion of powder material in conventional processing. The powder may be readily graded in composition in production, so as to achieve controlled composition variations and/or solidus and liquidus temperature variations in the applied powder. Conversely, if desired, the composition may be maintained precisely the same throughout the material.

In a second class of approaches, the metallic alloy powder is applied with an associated brief melting of the metallic alloy powder. Some examples include brazing using the metallic alloy powder as the source of the brazing alloy, and transient liquid phase bonding using the metallic alloy powder as the source of the material. In this case, the benefits include those benefits previously discussed for the first approach in which the metallic alloy powder is melted; enabling the selection, preparation, and use of new brazing alloys with volatile components; the ability to introduce innoculants that are stable only for short melting times; and the incorporation of thermophysically melt incompatible gettering elements into the braze alloy that getter oxygen and other environmental contaminants during the brazing process.

In a third class of approaches, the metallic alloy powder is applied without melting the metallic alloy powder. Some examples of such processes include articles or coatings where the powder is suspended in a carrier to form a slurry, formed to shape against a surface, and then sintered or baked; cold spray processes such as metal sprayed onto a ceramic surface; co-spray processes wherein an unmelted metal and a particulate component such as tungsten carbide are co-sprayed without melting; and vapor phase coating processes in which the meltless metallic alloy powder is used as the feedstock, particularly aluminum and alloys of aluminum and other elements such as chromium. In this case, the benefits of the meltless production of the powder, as set forth in the preceding paragraph, are realized. Additionally, the microstructure of the powder avoids the cast microstructure associated with melting and solidifying, which in conventional processes either are unavoidable or can be altered only with additional expensive processing modifications. Powders which cannot be produced because the alloy is limited by thermophysical melt incompatibility can be used in this approach. The present approach reduces cost and avoids structures and defects associated with melting and casting, to improve the mechanical properties of the final metallic article.

In one application of particular interest, the metallic alloy powder is mixed with a carrier, the mixture of the metallic alloy powder and the carrier is contacted to the surface of the substrate article, and the carrier is removed. If the carrier is selected to be a liquid, the mixture of the metallic alloy powder and the liquid carrier is a slurry that may be applied to the surface, and then the liquid carrier is removed by evaporation. In another application, the metallic alloy powder is applied to the substrate article as a coating. It may instead be used to join a first substrate article to a second substrate article, in which the metallic alloy powder is applied to both substrate surfaces to form a joint between them, in processes such as welding and transient liquid phase bonding. It may also be used to build up additional material onto an existing structure, as by laser deposition, or to build up an entire article, as in laser deposition wherein the powder is deposited upon a substrate article, and the substrate article is later removed.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
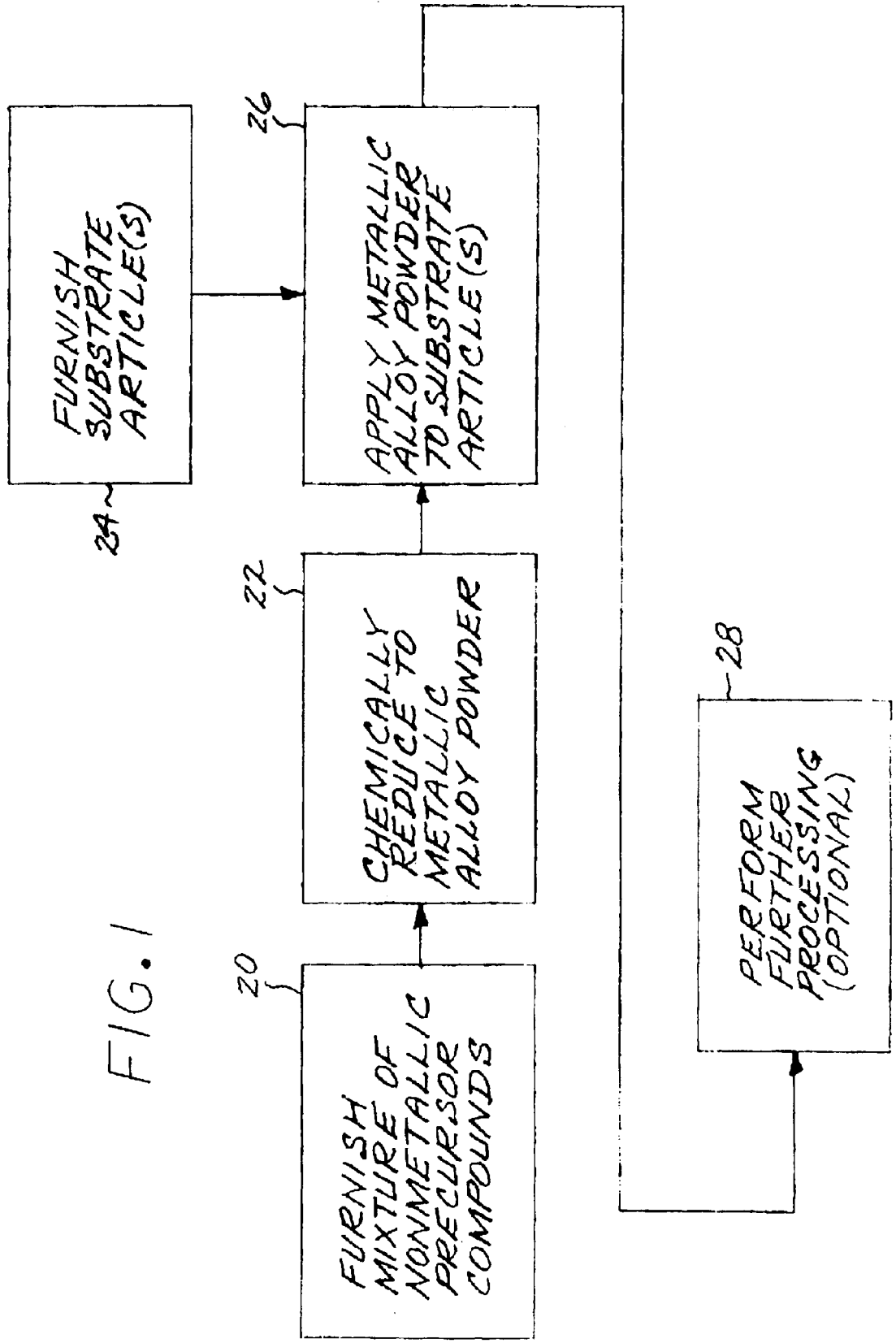
FIG. 1 is a block flow diagram of an approach for practicing the invention.

FIG. 1 depicts a method for fabricating and utilizing a metallic alloy made of metallic constituent elements. The method includes first furnishing a mixture of nonmetallic precursor compounds of the metallic constituent elements, step 20. "Nonmetallic precursor compounds" are nonmetallic compounds of the metals that eventually constitute the metallic alloy. Any operable nonmetallic precursor compounds may be used. Reducible oxides of the metals are the preferred nonmetallic precursor compounds for solid-phase reduction, and reducible halides of the metals are the preferred nonmetallic precursor compounds for vapor-phase reduction.

As used herein, the term "metallic alloy" includes both conventional metallic alloys and intermetallic compounds formed of metallic constituents, such as approximately equiatomic TiAl. Relatively small amounts of nonmetallic elements, such as boron, carbon, and silicon, may also be present. The nonmetallic precursor compounds collectively contain all of the metallic elements of the final metallic alloy, in the required proportions of the final metallic alloy. The metallic elements may be supplied by the nonmetallic precursor compounds in various ways. In the preferred approach, there is exactly one nonmetallic precursor compound for each alloying element, and that one compound provides all of the material for that respective metallic constituent in the alloy. That is, for a three-element metallic alloy that is the final result of the process, a first nonmetallic precursor compound supplies all of the first element, a second nonmetallic precursor compound supplies all of the second element, and a third nonmetallic precursor compound supplies all of the third element. Alternatives are within the scope of the approach, however. For example, several of the nonmetallic precursor compounds may together supply all of one particular metallic element. In another alternative, one nonmetallic precursor compound may supply all or part of two or more of the metallic elements. The latter approaches are less preferred, because they make more difficult the precise determination of the elemental proportions in the final metallic alloy. The final metallic alloy is typically not a stoichiometric compound, wherein the proportions of the elements reacting to form the compound are always the same.

The selection of the specific nonmetallic precursor compounds is dependent upon the specific metallic constituents and proportions of the final metallic alloy. In the preferred approach, the base metal constituent of the final metallic alloy, which by definition is present in an amount by weight greater than any other metallic constituent, is titanium, nickel, iron, or cobalt, but other base metals are operable as well. In a common situation, the base metal is present in an amount of at least 50 percent by weight of a total weight of the metallic constituents.

To cite an illustrative example, a preferred metallic alloy of particular interest is Ti-6Al-4V, which contains about 6 weight percent aluminum, about 4 weight percent vanadium, and the balance titanium. To make a Ti-6Al-4V metallic alloy using oxide nonmetallic precursor compounds, the titanium is supplied by titanium dioxide, the aluminum is supplied by aluminum oxide, and the vanadium is supplied by vanadium oxide, in relative amounts furnishing the proper proportions of titanium, aluminum, and vanadium.

The mixture of nonmetallic precursor compounds is thereafter chemically reduced by any operable technique to produce a metallic alloy, without melting the initial metallic material, step 22. As used herein, "without melting", "no melting", and related concepts mean that the material is not macroscopically or grossly melted, so that it liquefies and loses its shape. There may be, for example, some minor amount of localized, brief melting as low-melting-point elements melt and are diffusionally alloyed with the higher-melting-point elements that do not melt. Even in such cases, the gross shape of the material remains unchanged.

In one chemical reduction approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference in its entirety. Briefly, in fused salt electrolysis the mixture of nonmetallic precursor compounds is immersed in an electrolysis cell in a fused salt electrolyte such as a chloride salt at a temperature below the melting temperature of the alloy that forms from the nonmetallic precursor compounds. The mixture of nonmetallic precursor compounds is made the cathode of the electrolysis cell, with an inert anode. The elements combined with the metals in the nonmetallic precursor compounds, such as oxygen in the preferred case of oxide nonmetallic precursor compounds, are removed from the mixture by chemical reduction (i.e., the reverse of chemical oxidation). The reaction is performed at an elevated temperature. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a low level. The chlorides and mixtures of chlorides of barium, calcium, cesium, lithium, strontium, and yttrium are preferred as the molten salt. The chemical reduction is preferably, but not necessarily, carried to completion, so that the nonmetallic precursor compounds are completely reduced. Not carrying the process to completion is a method to control the oxygen content of the metal produced.

In another approach, termed vapor-phase reduction because the nonmetallic precursor compounds are furnished as vapors or gaseous phase, the chemical reduction may be performed by reducing mixtures of halides of the base metal and the alloying elements using a liquid alkali metal or a liquid alkaline earth metal. For example, titanium tetrachloride, as a source of titanium, and the chlorides of the alloying elements (e.g., aluminum chloride as a source of aluminum) are provided as gases. A mixture of these gases in appropriate amounts is contacted to molten sodium, so that the metallic halides are reduced to the metallic form. The metallic alloy is separated from the sodium. This reduction is performed at temperatures below the melting point of the metallic alloy, so that the alloy is not melted. The approach is described more fully in U.S. Pat. Nos. 5,779,761 and 5,958,106, whose disclosures are incorporated by reference in their entireties.

In another reduction approach, termed "rapid plasma quench" reduction, the precursor compound such as titanium chloride is dissociated in a plasma arc at a temperature of over 4500° C. The precursor compound is rapidly heated, dissociated, and quenched in hydrogen gas. The result is fine metallic-hydride particles. Any melting of the metallic particles is very brief, on the order of 10 seconds or less, and is within the scope of "without melting" and the like as used herein. The hydrogen is subsequently removed from the metallic-hydride particles by a vacuum heat treatment. Oxygen or other gas (e.g., nitrogen) may also be added to react with the alloy.

An advantage of all of these reduction techniques, for applications where the powder is subsequently melted, is that innoculants and other components may be readily introduced into or mixed with the particles. Such innoculants might include, for example, oxide particles that serve to refine the grain size of the joint that is produced when metallic material is eventually used as a supply of metal for subsequent application to a surface. Alternatively, a gettering element may be incorporated into the powder to ameliorate the effects of the joining environment by chemically reacting with environmental contaminants so that they are not incorporated into the metallic alloy in solid solution or as an undesirable second phase.

The result of the chemical reduction step 22 is a plurality of particles, with each particle comprising the metallic material. These particles are made without melting of the metallic alloy. The particles have low contents of impurities, such as metallic impurities, ceramic impurities, oxides, and the like, that result from conventional melting operations.

The particles exhibit a narrow size distribution, so that little screening or other size-classification processing is necessary to produce a particle mass suitable for the subsequent processing operations. As a result, the processing costs are reduced, both by reducing the amount of size-classification processing and also because the yield of particles is higher than in other particle-production approaches.

The particles may be of any operable shape and any operable size. They may be spherical or nonspherical.

Figure 2:
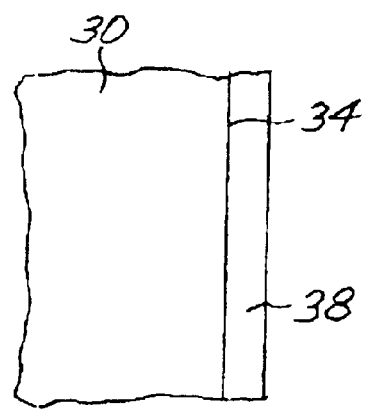
FIG. 2 is a schematic sectional view of a coated substrate article.
Figure 3:
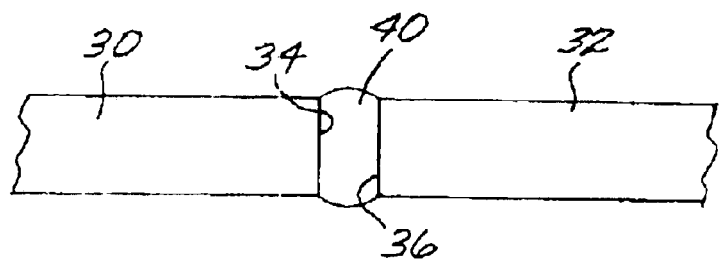
FIG. 3 is a schematic sectional view of two joined substrate articles.
Figure 4:
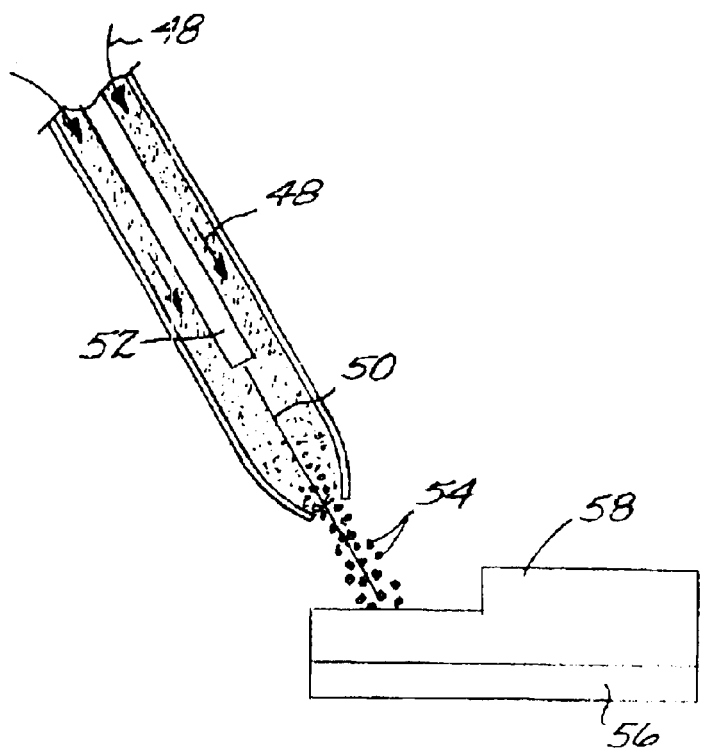
FIG. 4 is a schematic view of metallic alloy powder being used to build up a structure.

A substrate article 30 is furnished, step 24, and the metallic alloy powder is applied to a surface 34 of the substrate article 30, step 26. For some applications, a second substrate article 32 having a second-substrate-article surface 36 may also be furnished. FIGS. 2–4 illustrate three utilizations of the metallic alloy powder in step 24. In FIG. 2, the metallic alloy powder is applied to and bonded to the surface 34 of the substrate article 30 as a coating 38. The metallic powder may instead be applied to but not bonded to the surface of the substrate article, which in this case is a mold, so that the applied metallic powder may be removed from the mold.

In FIG. 3, the metallic alloy powder is applied to and bonded to the surface 34 of the substrate article 30 and also applied to and bonded to the surface 36 of the substrate article 32 to form a joint 40 that joins the two substrate articles 30 and 32 together. In either utilization of the metallic alloy powder, the metallic alloy powder may be unmelted during the application step 26, or it may be melted during the application step 26. After or concurrently with the application step 26, the applied metallic alloy material may optionally be further processed, step 28, in a manner consistent with the nature of the powder and step 26. For example, if the powder is applied in a carrier and/or binder, the carrier and/or binder may be removed by any operable technique. The applied material may be heated and/or compressed to consolidate it, heat treated, thermomechanically processed, sintered, coated, machined, cleaned, or otherwise processed.

In FIG. 4, a flow 48 of the metallic alloy powder is fed into a beam 50 of a laser 52. The flow 48 of the metallic alloy powder is melted to form droplets 54, which are then deposited upon a substrate article 56. The droplets 54 gradually form a buildup structure 58 that may be of the same composition as the substrate article 56 or a different composition. This approach may be used, for example, to fabricate complex structures such as ducts with an integral waffle-grid reinforcement pattern. The substrate article 56 may remain at the completion of the deposition, so that the buildup adds to the substrate article with the same composition as, or a different composition than, the substrate article 56. Alternatively, the substrate article 56 may be a temporary substrate article 56 that is later removed, as by machining, so that only the buildup structure 58 remains.

In another application, the metallic alloy powder is mixed with a carrier, the mixture of the metallic alloy powder and the carrier is contacted to the surface of the substrate article, and the carrier is removed, leaving the metallic alloy powder on the surface. The carrier may be a liquid, such as an organic liquid and a binder, that is subsequently evaporated. In one variation, the metallic alloy powder is typically thereafter bonded to the surface by either a solid-state or liquid-phase sintering and bonding approach. In another variation, the metallic alloy powder is removed, usually with the binder still in place, and then heated to remove the binder and bond the powder particles together.

In yet another application approach, the metallic alloy powder is partially or fully vaporized and deposited upon the surface(s). Examples include using the metallic alloy powder as a source powder in vapor phase aluminiding, or using it as the source powder in a spray approach such as plasma spraying.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating and utilizing a metallic alloy made of metallic constituent elements, comprising the steps of furnishing a mixture of nonmetallic precursor compounds of the metallic constituent elements; thereafter chemically reducing the mixture of nonmetallic precursor compounds to produce a metallic alloy as a metallic alloy powder, without melting the metallic alloy; and thereafter applying the metallic alloy powder to a surface of a substrate article.

2. The method of claim 1, wherein the step of furnishing the mixture includes the step of furnishing the mixture comprising oxide precursor compounds.

3. The method of claim 1, wherein the step of furnishing the mixture includes the step of furnishing the mixture comprising halide precursor compounds.

4. The method of claim 1, wherein the step of chemically reducing includes the step of chemically reducing the mixture of nonmetallic precursor compounds by solid-phase reduction.

5. The method of claim 1, wherein the step of chemically reducing includes the step of chemically reducing the compound mixture by vapor-phase reduction.

6. The method of claim 1, wherein the step of applying includes the step of mixing the metallic alloy powder with a carrier, contacting the mixture of the metallic alloy powder and the carrier to the surface of the substrate article, and removing the carrier.

7. The method of claim 1, wherein the step of applying includes the step of mixing the metallic alloy powder with a liquid carrier to form a slurry, contacting the slurry to the surface of the substrate article, and evaporating the liquid carrier.

8. The method of claim 1, wherein the step of applying includes the step of depositing the metallic alloy powder as a coating.

9. The method of claim 1, wherein the step of applying includes the step of utilizing the metallic alloy powder to join the substrate article to a second substrate article.

10. The method of claim 1, wherein the step of furnishing a mixture includes the step of furnishing a gettering element in the precursor compounds.

11. The method of claim 1, wherein the step of applying includes the step of applying the metallic alloy powder without melting the metallic alloy powder.

12. The method of claim 1, wherein the step of applying includes the step of melting the metallic alloy powder.

13. The method of claim 1, wherein the step of applying includes the step of applying the metallic alloy powder by laser deposition.

14. The method of claim 1, wherein the step of applying includes the step of applying the metallic alloy powder to a substrate article to form a buildup structure, and thereafter removing the substrate article.

15. A method for fabricating and utilizing a metallic alloy made of metallic constituent elements, comprising the steps of
furnishing a mixture of nonmetallic precursor compounds of the metallic constituent elements; thereafter
chemically reducing the mixture of nonmetallic precursor compounds to produce a metallic alloy as a metallic alloy powder, without melting the metallic alloy, by a technique selected from the group consisting of solid-phase reduction and vapor-phase reduction; and thereafter
applying the metallic alloy powder to a surface of a substrate article, wherein the step of applying includes the step of depositing the metallic alloy powder as a coating.

16. The method of claim 15, wherein the step of furnishing the mixture includes the step of
furnishing the mixture comprising oxide precursor compounds.

17. The method of claim 15, wherein the step of applying includes the step of
applying the metallic alloy powder without melting the metallic alloy powder.

18. The method of claim 15, wherein the step of applying includes the step of
melting the metallic alloy powder.

19. A method for fabricating and utilizing a metallic alloy made of metallic constituent elements, comprising the steps of
furnishing a mixture of nonmetallic precursor compounds of the metallic constituent elements; thereafter
chemically reducing the mixture of nonmetallic precursor compounds to produce a metallic alloy as a metallic alloy powder, without melting the metallic alloy, by a technique selected from the group consisting of solid-phase reduction and vapor-phase reduction; and thereafter
applying the metallic alloy powder to a surface of a substrate article, wherein the step of applying includes the step of utilizing the metallic alloy powder to join the substrate article to a second substrate article.

20. The method of claim 19, wherein the step of furnishing the mixture includes the step of
furnishing the mixture comprising oxide precursor compounds.

21. The method of claim 19, wherein the step of applying includes the step of
applying the metallic alloy powder without melting the metallic alloy powder.

22. The method of claim 19, wherein the step of applying includes the step of
melting the metallic alloy powder.

* * * * *